United States Patent
Oettinger et al.

(10) Patent No.: US 7,391,975 B2
(45) Date of Patent: Jun. 24, 2008

(54) METHOD OF SYNCHRONIZING SERVO TIMING IN AN OPTICAL WIRELESS LINK

(75) Inventors: Eric G. Oettinger, Rochester, MN (US); Mark D. Heminger, Rochester, MN (US); Todd B. Anderson, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 916 days.

(21) Appl. No.: 10/134,763

(22) Filed: Apr. 29, 2002

(65) Prior Publication Data

US 2004/0213281 A1    Oct. 28, 2004

(51) Int. Cl.
 *H04B 10/00* (2006.01)
(52) U.S. Cl. .............. 398/129; 398/121; 398/122; 398/123; 398/124; 398/128; 398/130; 398/135; 398/115; 398/154; 398/155; 398/156; 398/136; 398/137; 398/33; 370/442; 370/315; 370/316; 370/401; 455/569; 455/574; 455/575
(58) Field of Classification Search ............ 359/161, 359/132; 340/825.49; 455/39, 569, 574, 455/575; 370/4, 442, 316, 401, 315; 398/118, 398/121, 122, 123, 124, 128, 129, 130, 131, 398/135, 137, 136, 154, 155, 156, 115, 33
See application file for complete search history.

(56) References Cited

U.S. PATENT DOCUMENTS

| | | | | |
|---|---|---|---|---|
| 5,592,320 A * | 1/1997 | Wissinger | ................ | 398/121 |
| 5,684,614 A * | 11/1997 | Degura | ................ | 398/131 |
| 5,917,425 A * | 6/1999 | Crimmins et al. | ...... | 340/825.49 |
| 5,926,302 A * | 7/1999 | Hirohashi et al. | ........... | 398/119 |
| 6,057,949 A * | 5/2000 | Kinstler | ................ | 398/154 |
| 6,393,306 B1 * | 5/2002 | Hobbi | ................ | 455/566 |
| 6,577,421 B1 * | 6/2003 | Cheng et al. | ................ | 398/129 |
| 6,915,080 B2 * | 7/2005 | Heminger et al. | ........... | 398/129 |
| 6,941,076 B1 * | 9/2005 | Adams et al. | ................ | 398/130 |
| 2002/0181055 A1 * | 12/2002 | Christiansen et al. | ........... | 359/159 |

* cited by examiner

*Primary Examiner*—Hanh Phan
(74) *Attorney, Agent, or Firm*—William B. Kempler; W. James Brady, III; Frederick J. Telecky, Jr.

(57) ABSTRACT

A technique for synchronizing the servo control systems between two optical wireless links (OWLs) that are in communication with one another. This synchronization allows the alignment in time of the various tasks to be assigned in a desired time period. The synchronization is not intended to synchronize the two OWLs down to the processor clock level, but rather at the servo sampling level, preferably to within a few percent of the servo sampling time. This synchronization may be advantageous in improving processor efficiency and control loop performance, and or improving system calibrations.

9 Claims, 3 Drawing Sheets

METHOD OF SYNCHRONIZING SERVO TIMING IN AN OPTICAL WIRELESS LINK

BACKGROUND OF THE INVENTION

1. Field of the Invention

This invention relates generally to optical wireless communication links, and more particularly, to a method of synchronizing servo timing in an optical wireless link (OWL).

2. Description of the Prior Art

An optical wireless link system consists of two stations: Each of which contains an optical transmitter and an optical receiver. The transmitter is able to change the direction of its transmitted beam by known amounts of angular displacement. The receiver sees this motion and sends position correction information back to the transmitter. This feedback is used by a servo control loop to position the transmitted beam on the receiver of the remote station.

While both OWL's have roughly equal sample periods, their servo systems generally operate in an asynchronous mode from one another. This asynchronous operating mode however, is not always an optimal configuration. When a position feedback packet is received by a first OWL, for example, some processing is required to identify the packet as a position feedback packet, and then proceed to process the position feedback information for control use. The first OWL's data processor also has other periodic tasks, such as sampling its own position detectors, and preparing related data for transmission to the second OWL. If the incoming packet is aligned in time with the sampling and transmission of the local position, a delay will occur in the feedback loop as one task waits on completion of the other. This delay can have adverse implications on the control system, such as, for example, decreasing the phase margin.

In view of the foregoing, it would be desirable and advantageous in the optical wireless communication art to provide a technique that synchronizes servo timing in an optical wireless communication link.

SUMMARY OF THE INVENTION

The present invention is directed to a technique for synchronizing the control loops operating on two OWLs that are in communication with one another. This synchronization allows the alignment in time of the various tasks to be assigned in a desired time period. The synchronization is not intended to synchronize the two OWLs down to the processor clock level, but rather at the servo sampling level, preferably to within a few percent of the servo sampling time.

In one aspect of the invention, a method is provided for synchronizing servos in an optical wireless communication link to improve data processing efficiency and or control loop performance.

In another aspect of the invention, a method for synchronizing servos in an optical wireless communication link is provided that is also useful in performing communication link calibrations.

One embodiment of the present invention comprises a method of synchronizing servo timings in an optical wireless link (OWL), the method comprising the steps of: transmitting via a remote OWL, a data packet that contains servo position feedback information and a local timer register value; sampling and processing via a local OWL, the data packet transmitted by the remote OWL; comparing the value in the local timer register associated with the local OWL with the local timer register value received from the remote OWL; adjusting the value in the local timer register associated with the local OWL closer to the local timer register value associated with the remote OWL until the difference in values no longer exceeds a desired threshold; and halting the local timer register adjustment process only until the difference in values again exceeds the desired threshold, such that the local and remote OWL units are synchronized at a servo sampling level, and further such that servo synchronization between the OWL units is implemented to within a few percent of the servo sampling time.

DESCRIPTION OF THE DRAWINGS

Other aspects, features and advantages of the present invention will be readily appreciated, as the invention becomes better understood by reference to the following detailed description when considered in connection with the accompanying drawing figure wherein.

While the above-identified drawing figure sets forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
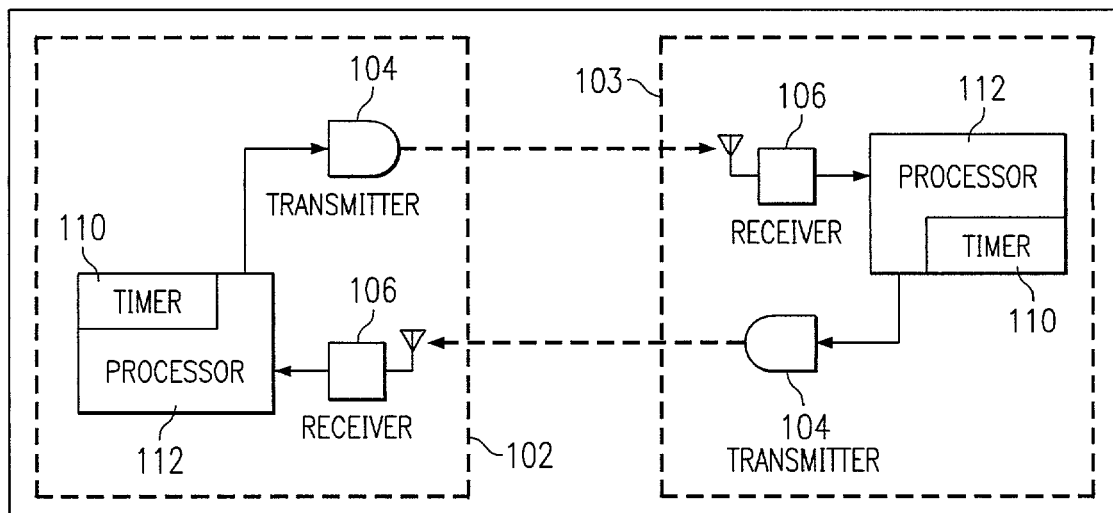
FIG. 1 is a block diagram illustrating a pair of OWLs communicating with one another in which each OWL includes a transmitter, receiver and a processor including a local timer.

FIG. 1 is a block diagram illustrating an OWL system 100 having a pair of OWLs 102, 103 communicating with one another in which each OWL includes a transmitter 104, receiver 106 and a processor 112 including a local timer 110. The transmitter 104 is able to change the direction of its transmitted beam by known amounts of angular displacement. The receiver 106 sees this motion as a linear displacement, and sends position correction information back to the transmitter 104. This feedback is used by a servo control loop algorithm to position the transmitted beam on the receiver 106 of the remote station. U.S. patent application Ser. No. 10/060,549, entitled Calibration Method For Station Orientation, filed by Oettinger et al. on Jan. 30, 2002, discloses a method of calibrating station orientation in an OWL. The '549 patent application is assigned to the assignee of the present invention, and is hereby incorporated by reference in its entirety herein.

While both OWLs 102, 103 have roughly equal sample periods, their servo systems generally operate in an asynchronous mode from one another. This asynchronous operating mode however, is not always an optimal configuration. When a position feedback packet is received by a first OWL 102, for example, some processing is required to identify the packet as a position feedback packet, and then proceed to process the position feedback information for control use. The first OWL's data processor 112 also has other periodic tasks, such as sampling its own position detectors, and preparing related data for transmission to the second OWL 103. If the incoming packet is aligned in time with the sampling and transmission of the local position, a delay will occur in the feedback loop as one task waits on completion of the other. This delay can have adverse implications on the control system, such as, for example, decreasing the phase margin. In view of the foregoing, a technique for synchronizing the servo control systems between two OWLs 102, 103 that are in communication with one another is now described herein below.

Figure 2:
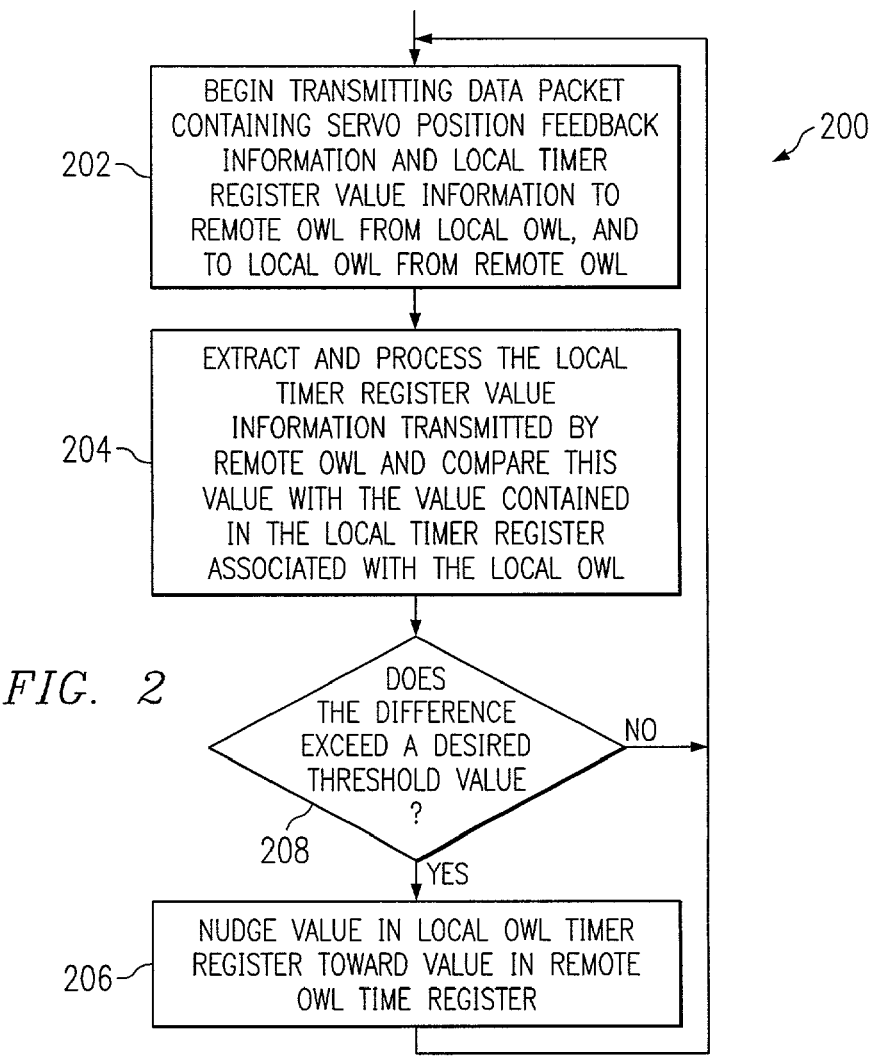
FIG. 2 is a flow-chart depicting a method of synchronizing servo timing in an optical wireless link according to one embodiment of the present invention.
Figure 3:
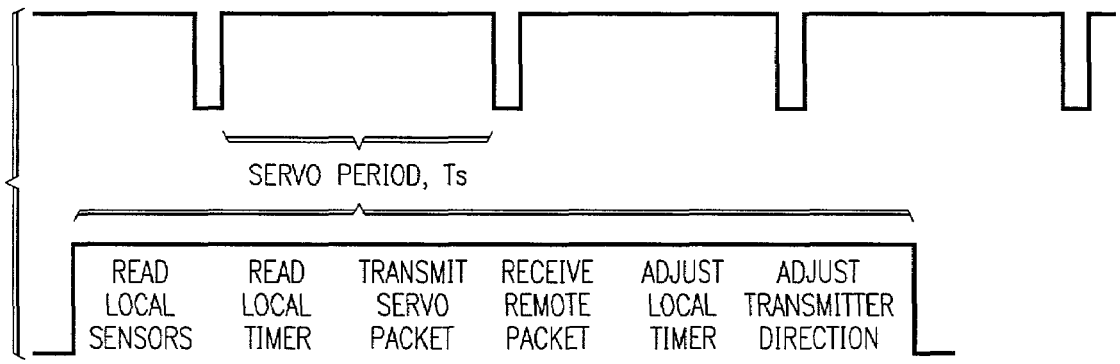
FIG. 3 is a timing diagram illustrating periodic servo timing, including an exploded view detailing tasks performed during one servo period.
Figure 4:
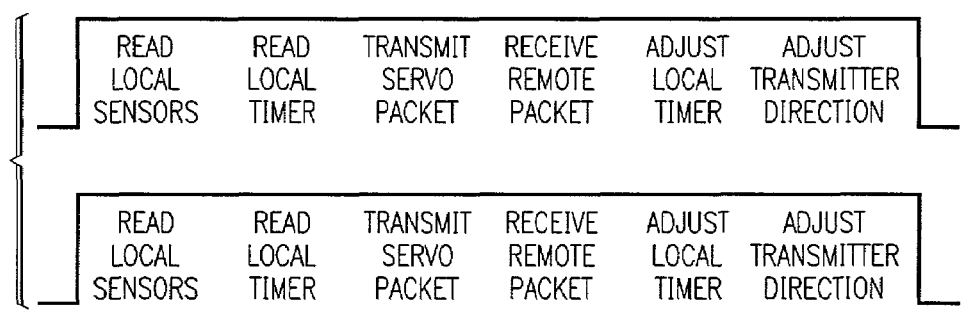
FIG. 4 illustrates two servo periods which are aligned in time.

FIG. 2 is a flow-chart depicting a method 200 of synchronizing servo timing in an optical wireless link according to one embodiment of the present invention. The method begins as shown in block 202, by first transmitting a servo packet such as illustrated in FIG. 3, from a local OWL to a remote OWL; wherein the servo packet contains servo position feedback information as well as the value of the local timer register associated with the local OWL. The local OWL then receives a similarly constructed packet from the remote OWL, also shown in block 202. The local OWL then extracts the value of the local timer register associated with the remote OWL and compares this value to the value in its own timer register as seen in block 204. If a determination is made that the difference in compared timer register values exceeds a desired threshold, the value in the local timer register associated with the OWL making the comparison is adjusted slightly, for example moving about ten percent of the difference, toward the value in the remote OWL's local timer register as seen in block 206. This process is then repeated over many samples until the two timers converge, as seen in blocks 202 through 208. It can be appreciated that this process 200 is not intended to synchronize the local OWL and the remote OWL units down to the data processor clock level, but rather at the servo sampling level. Synchronization at the servo sampling level most preferably then is accomplished to within a few percent of the servo sampling time. This process allows the alignment in time of the various data processing tasks to be assigned in a desired order, such as illustrated in FIG. 4. Processing of the local position detectors can occur, for example, in the first half of the sample shown in FIG. 4; while sampling and processing of the received remote data packet can occur in the second half, also shown in FIG. 4.

Figure 5:
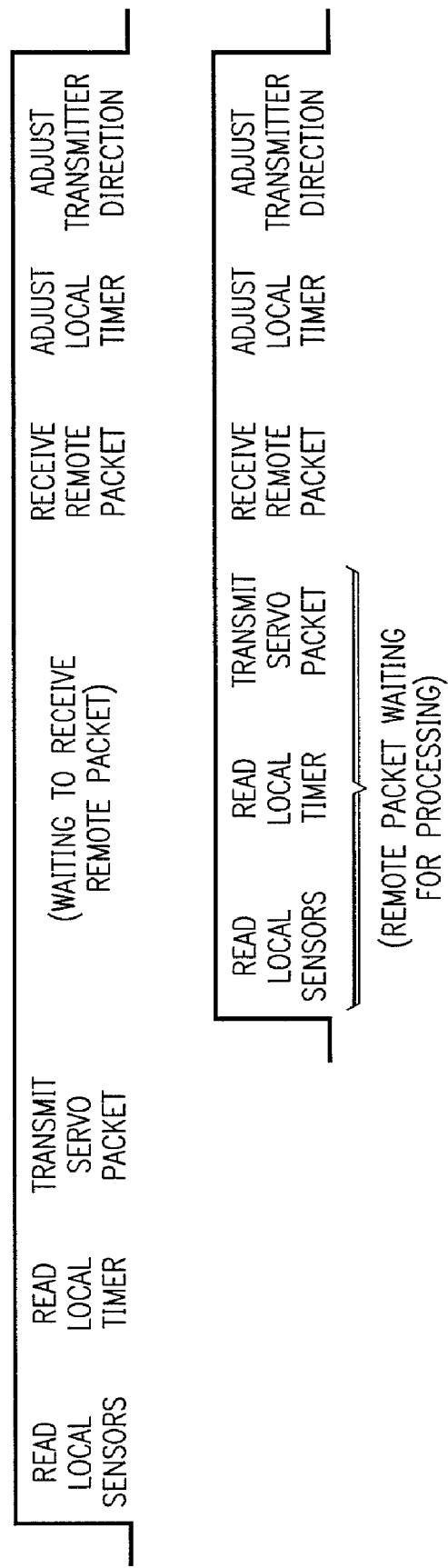
FIG. 5 is a diagram illustrating the detrimental effects associated with misaligned servo periods.

Those skilled in the art will readily appreciate that having the two OWLs aligned may also result in more accurate measurements during calibration. As two OWLs perform similar motions and measurements, for example, the measured versus expected values will be closer if they start moving at the same time. Any misalignment in time of the various processing tasks will cause a delay to occur in the feedback loop as one task waits on completion of the other, such as illustrated in FIG. 5.

In view of the above, it can be seen the present invention presents a significant advancement in the art of optical wireless communication techniques. Further, this invention has been described in considerable detail in order to provide those skilled in the optical wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. An optical wireless link (OWL) comprising:
    a transmitter;
    a receiver;
    a data processor; and
    a servo loop algorithmic software, wherein the data processor operates in response to the algorithmic software post-acquisition, to synchronize a servo loop clock associated with the transmitter and a servo loop clock associated with the receiver so that a servo sample time period for each is substantially the same.

2. The OWL according to claim 1, wherein the servo loop comprises a local timer register.

3. The OWL according to claim 2, wherein the servo sample time period is associated with a timer value stored in the local timer register.

4. The OWL according to claim 3, wherein the servo sample time period is further associated with a timer value stored in a remote OWL local timer register.

5. A method of post-acquisition optical wireless communication comprising the steps of:
    providing an optical wireless link (OWL) having a transmitter, a receiver, a data processor, and a servo loop algorithmic software; and
    processing an incoming data packet from a remote OWL to synchronize a clock associated with a servo loop associated with the OWL according to so that a servo sample time period for the transmitter and the receiver are substantially the same.

6. The method of claim 5 wherein the step of processing an incoming data packet from a remote OWL comprises the steps of:
    sampling a data packet from a remote OWL containing a value of a local timer register associated with the remote OWL;
    comparing a value in a local timer register associated with the OWL and the local timer register value transmitted via the remote OWL;
    adjusting the value in the local timer register associated with the OWL closer to the local timer register value associated with the remote OWL when a difference in compared values exceeds a desired threshold; and
    halting the local timer register adjustment process only until the difference again exceeds the desired threshold, such that the OWL and remote OWL units are continuously synchronized at a servo sampling level, and further such that servo synchronization between the OWL units is implemented to within a few percent of the servo sampling time.

7. The method of claim 5 where the step of processing an incoming data packet from a remote OWL to synchronize the servo loop comprises aligning periodic tasks within a servo sample period.

8. The method of claim 5 where the step of processing an incoming data packet from a remote OWL to synchronize the servo loop according to a servo sample time period comprises aligning periodic tasks to achieve a desired calibration level between the OWL and the remote OWL.

9. A method of operating an optical wireless link (OWL) post-acquisition comprising the steps of:
    providing an OWL having a transmitter, a receiver, a data processor, and a servo loop algorithmic software; and processing an incoming data packet from a remote OWL to align periodic tasks to be within a servo sample period associated with the OWL;

wherein the step of aligning periodic tasks within a servo sample period comprises the steps of:

sampling a data packet from a remote OWL containing a value of a local timer register associated with the remote OWL;

comparing a value in a local timer register associated with the OWL with the local timer register value transmitted via the remote OWL;

adjusting the value in the local timer register associated with the OWL closer to the local timer register value associated with the remote OWL when the difference in compared values exceeds a desired threshold; and halting the local timer register adjustment process only until the difference again exceeds the desired threshold, such that the local and remote OWL units are synchronized at a servo sampling level, and further such that servo synchronization between the OWL units is implemented to within a few percent of the servo sampling time.

* * * * *